US008456468B2

(12) United States Patent
Falchetto

(10) Patent No.: US 8,456,468 B2
(45) Date of Patent: Jun. 4, 2013

(54) GRAPHIC RENDERING METHOD AND SYSTEM COMPRISING A GRAPHIC MODULE

(75) Inventor: Mirko Falchetto, Milzano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1513 days.

(21) Appl. No.: 12/013,256

(22) Filed: Jan. 11, 2008

(65) Prior Publication Data

US 2008/0211810 A1 Sep. 4, 2008

(30) Foreign Application Priority Data

Jan. 12, 2007 (IT) ............................... MI2007A0038

(51) Int. Cl.
*G06T 15/40* (2011.01)
(52) U.S. Cl.
USPC .......................................... 345/422; 345/421
(58) Field of Classification Search
USPC .............................. 345/422, 473, 506; 725/62
See application file for complete search history.

(56) References Cited

U.S. PATENT DOCUMENTS

| | | | | |
|---|---|---|---|---|
| 5,854,631 | A | 12/1998 | Akeley et al. | 345/419 |
| 6,628,836 | B1 | 9/2003 | Wittenbrink et al. | 382/232 |
| 6,646,639 | B1 | 11/2003 | Greene et al. | 345/422 |
| 6,828,978 | B2 | 12/2004 | Buehler | 345/543 |
| 7,064,752 | B1 * | 6/2006 | Larson | 345/419 |
| 7,310,098 | B2 | 12/2007 | Ohba | 345/428 |
| 7,969,436 | B1 * | 6/2011 | Greene et al. | 345/422 |
| 7,978,194 | B2 * | 7/2011 | Seiler et al. | 345/422 |
| 2001/0055012 | A1 | 12/2001 | Lewis et al. | 345/418 |
| 2004/0130552 | A1 * | 7/2004 | Duluk et al. | 345/506 |
| 2004/0212614 | A1 * | 10/2004 | Aila et al. | 345/421 |
| 2005/0052461 | A1 * | 3/2005 | Vassilev et al. | 345/473 |
| 2005/0055719 | A1 * | 3/2005 | Matila | 725/62 |
| 2006/0209065 | A1 * | 9/2006 | Lapidous et al. | 345/422 |
| 2006/0209078 | A1 * | 9/2006 | Anderson et al. | 345/506 |

FOREIGN PATENT DOCUMENTS

EP 1 496 704 1/2005

OTHER PUBLICATIONS

Allard et al., "A Shader-Based Parallel Rendering Framework," in IEEE Visualization 2005, Minneapolis, MN, USA, Oct. 23-28, 2005, pp. 127-134.

(Continued)

*Primary Examiner* — Xiao M. Wu
*Assistant Examiner* — Phi Hoang
(74) *Attorney, Agent, or Firm* — Seed IP Law Group PLLC

(57) ABSTRACT

A method for rendering a three dimensional scene on a displaying screen comprises: generating for a tile of a current scene a hierarchical z-buffer which comprises a plurality of levels organized according to depth values; calculating a minimum depth value d of a submitted primitive; calculating an intersection area associated with said primitive with respect to said tile; providing a multiplicity of aligned regions each associated with a level of the hierarchical z-buffer so that the exact area calculated is suitable to be covered, at least entirely, by the union of such aligned regions; comparing the minimum depth value d of the submitted primitive with corresponding maximum depth values v1, v2, . . . , vN each read from the levels of the hierarchical z-buffer; discarding said primitive whether the minimum depth value d is bigger than all maximum depth values v1, v2, . . . , vN.

21 Claims, 7 Drawing Sheets

OTHER PUBLICATIONS

Falchetto et al., "Sort Middle Pipeline Architecture for Efficient 3D Rendering," in International Conference on Consumer Electronics, Las Vegas, NV, USA, Jan. 10-14, 2007, pp. 1-2.

Fuchs et al., "Pixel-Planes 5: A Heterogeneous Multiprocessor Graphics System Using Processor-Enhanced Memories," Computer Graphics, vol. 23, No. 3, Jul. 1989, pp. 79-88.

Moller et al., "Real Time Rendering," AK Peters Publishers, 1999, pp. 7-23.

Molnar et al., "A Sorting Classification of Parallel Rendering," IEEE Computer Graphics, vol. 14, No. 4, Jul./Aug. 1994, pp. 1-11.

Munshi, "OpenGL ES Common/Common-Lite Profile Specification," Version 1.1.04 (Annotated), The Khronos Group Inc., 2004, 123 pages.

Segal et al., "The OpenGL Graphics System: A Specification (Version 1.5)," Silicon Graphics, Inc., 2003, 333 pages.

Watt, "Fundamentals of Three-dimensional Computer Graphics," Addison-Wesley Publishing Company, Reading, Mass., 1991, pp. 97-113.

Example screen shots from "Quake III Arena," ID Software Inc., 1999, URL=ftp//ftp.idsoftware.com/idstuff/quake3/win32/q3ademo.exe, retrieved Nov. 29, 2011, 20 pages.

* cited by examiner

| Macroblock size | Proposed OC | Reference OC | Non-adaptive OC |
|---|---|---|---|
| 32x32 | 28.32% | 20.54% | 16.59% |
| 64x64 | 22.13% | 15.36% | 9.38% |
| 128x128 | 16.59% | 10.10% | 3.69% |

| | QVGA – NoAA (IMR) | QVGA – NoAA (SMR) | VGA – 4x RGSS (IMR) | VGA – 4x RGSS (SMR) |
|---|---|---|---|---|
| Depth BW | 14.56 | 0.00 | 184.58 | 0.00 |
| Colour BW | 44.79 | 0.79 | 567.71 | 35.16 |
| Texture BW | 17.77 | 20.47 | 63.27 | 54.19 |
| Binner BW | 0(*) | 9.53 | 0(*) | 11.60 |
| Parser BW | 0(*) | 16.74 | 0(*) | 57.04 |
| Total | 77.13 | 55.53 | 815.56 | 157.98 |

GRAPHIC RENDERING METHOD AND SYSTEM COMPRISING A GRAPHIC MODULE

BACKGROUND

1. Technical Field

The present disclosure relates to the technical field of graphic rendering and, particularly, to 3D (three-dimensional) rendering. More particularly, the present disclosure can be applied to the sort-middle technique.

2. Description of the Related Art

Computer graphics is the technique of generating pictures with a computer. Generation of pictures, or images, is commonly called rendering. Generally, in three-dimensional (3D) computer graphics, geometry that represents surfaces (or volumes) of objects in a scene is translated into pixels and then displayed on a display device.

In computer graphics each object to be rendered is composed of a number of primitives. A primitive is a simple geometric entity such as, e.g., a point, a line, a triangle, a square, a polygon or high-order surface.

A summary of the prior art rendering process can be found in:

"Fundamentals of Three-dimensional Computer Graphics", by Watt, Chapter 5;

The Rendering Process, pages 97 to 113, published by Addison-Wesley Publishing Company, Reading, Mass., 1989, reprinted 1991, ISBN 0-201-15442-0; or in:

"Real Time Rendering", by T. Moller, E. Haines, Chapter 2: The Graphics Rendering Pipeline, pages 7 to 23, published by A K Peters, 1999, ISBN 1-56881-101-2.

Two main rendering techniques are known: the traditional technique (also called "immediate mode rendering") and the sort-middle technique (also called tile-based rendering).

According to the first rendering technique, a graphic pipeline, known by those skilled in the art as an immediate mode renderer, processes a set of three-dimensional (3D) primitives by a client-server mechanism based on an application programming interface (API). Particularly, such primitives are processed in the submission order.

Main features related to the immediate mode rendering are described in the following documents:

A. Munshi, "OpenGL/ES Common/Common-Lite Profile Specification, Version 1.1 (Annotated); Editor (version 1.1);

M. Segal, K. Akely, J. Leach, "The OpenGL Graphics System: A Specification (Version 1.5)", Mark and Kurt Akely Editor;

"Quake III Arena", ID Software Inc. 199,ftp//ftp. idsoftware.com/idstuff/quake3/win32/q3ademo.exe.

T. A. Moller and H. Heines, "Real-Time Rendering", A K Peters 2nd edition 2002.

FIG. 1 shows a graphic pipeline 1 known as "sort-middle pipeline" according to the second rendering technique. Particularly, such sort-middle pipeline 1 comprises: a driver stage 2 (usually located in a central processing unit or CPU), a geometry stage (also known as a Transform and Lighting, TnL, motor) 3, a pre-processing module 4, a rasterizer 5 and a fragment processor 6. The pre-processing module 4 also known as tiler is suitable to exchange data with a scene buffer (SB) 7.

Such graphic pipeline 1 operates to process primitives in order to compose an external color buffer or frame buffer 8, a depth buffer 11 and a texture memory 12 of a displayed final scene. Particularly, in accordance with the sort-middle approach the scene is decomposed into tiles which are rendered one by one. This allows color components and z values of one tile to be stored in small, on-chip buffers: a first color buffer (CB) 9 and a first depth buffer (DB) 10, respectively. In this way, only the pixels visible in the final scene need to be stored in the external frame buffer 8.

Examples of the sort-middle rendering technique are described in:

S. Molnar, M. Cox, D. Ellsworth, H. Fuchs, "A sorting classification of parallel rendering", IEE Computer Graphics July/August 1994 (Vol. 14, No. 4), pp. 23-32;

H. Fuchs et al. "Pixel-Planes 5:A Heterogeneous Multiprocessor Graphics System Using Processor-Enhanced Memories", Computer Graphics, Volume 23, No. 3, July 1989.

BRIEF SUMMARY

The applicant observes that in rendering processing a current primitive can occlude or overlap a previously drawn primitive. Hence, a pixel on the screen can be drawn several times causing an increasing of the overdraw factor which is indicative of a ratio between the total number of pixels (or fragments) processed and written into the frame buffer and the frame buffer resolution.

It has been noticed that there is a need in the field in reducing the overdraw factor since this reduction allows to increase the bandwidth connected to the pipeline buffers and limit the access to such graphic pipeline buffers.

In accordance with a particular embodiment, a graphic rendering method comprises:

generating for a tile of a current scene a hierarchical z-buffer which comprises a plurality of levels organized by increasing depth values, calculating a minimum depth value d of each submitted primitive, calculating an exact area associated with said primitive with respect to said tile, providing a multiplicity of aligned regions each associated with a level of the hierarchical z-buffer so that the exact area calculated is suitable to be covered, at least entirely, by the union of such aligned regions, comparing the minimum depth value d of the submitted primitive with corresponding maximum depth values $v1$, $v2$, ..., $vN$ each read from the levels of the hierarchical z-buffer, discarding said primitive whether the minimum depth value d is bigger than all maximum depth values $v1$, $v2$, ..., $vN$.

This and other aspects of the disclosure will be apparent upon reference to the attached figures and following detailed description.

DETAILED DESCRIPTION

Figure 3:
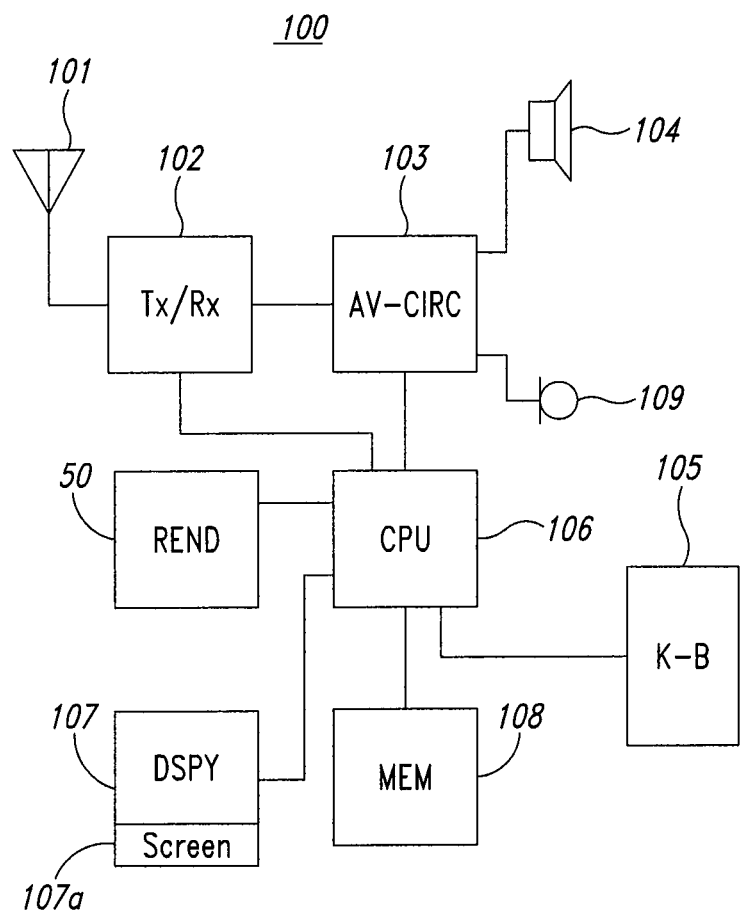
FIG. 3 shows an embodiment of a graphic system comprising the graphic module of FIG. 2.

FIG. 3 shows a graphic system 100 according to an embodiment of the disclosure and comprising a graphic module 50 (REND). The graphic system 100 illustrated in FIG. 3 is a mobile phone, but in accordance with further embodiments, graphic system 100 can be another system such as a personal digital assistant (PDA), a computer (e.g., a personal computer), a game console, a car navigation system, a set top box (STB), etc.

As an example, the mobile phone 100 can be a cellular phone provided with an antenna 101, a transceiver 102 (Tx/Rx) connected with the antenna 101, an audio circuit unit 103 (AU-CIRC) connected with the transceiver 102. A speaker 104 and a microphone 109 are connected with the audio circuit unit 103.

Further, the mobile phone 100 is provided with a CPU (central processing unit) 106 for controlling various functions and, particularly, the operation of the transceiver 102 and the audio circuit unit 103 according to a control program stored in a system memory 108 (MEM), connected to the CPU 106. The graphic module 50 is coupled to and controlled by the CPU 106. Moreover, mobile phone 100 is provided with a display unit 107 provided with a corresponding screen 107*a* (e.g., a liquid crystal display, DSPY), and a user interface 105, such as an alphanumeric keyboard (K-B).

The graphic module 50 is configured to perform a set of graphic functions to render an image on the screen 107*a* of the display 107. Preferably, the graphic module 50 is a graphic engine configured to render images, offloading the CPU 106 from performing such task. As used herein, the term "graphic engine" means a device which performs rendering in hardware or software not running on a CPU, but on another coprocessor such as a DSP (digital signal processor). The terms "graphic accelerator" and "graphic coprocessor", also employed in the field, are equivalent to the term "graphic engine."

Alternatively, the graphic module 50 can be a graphic processing unit (GPU) wherein the rendering functions are performed on the basis of hardware and software instructions executed on a dedicated processor such as a DSP. In accordance with a further embodiment, some or all the rendering functions are performed by the CPU 106.

Figure 1:
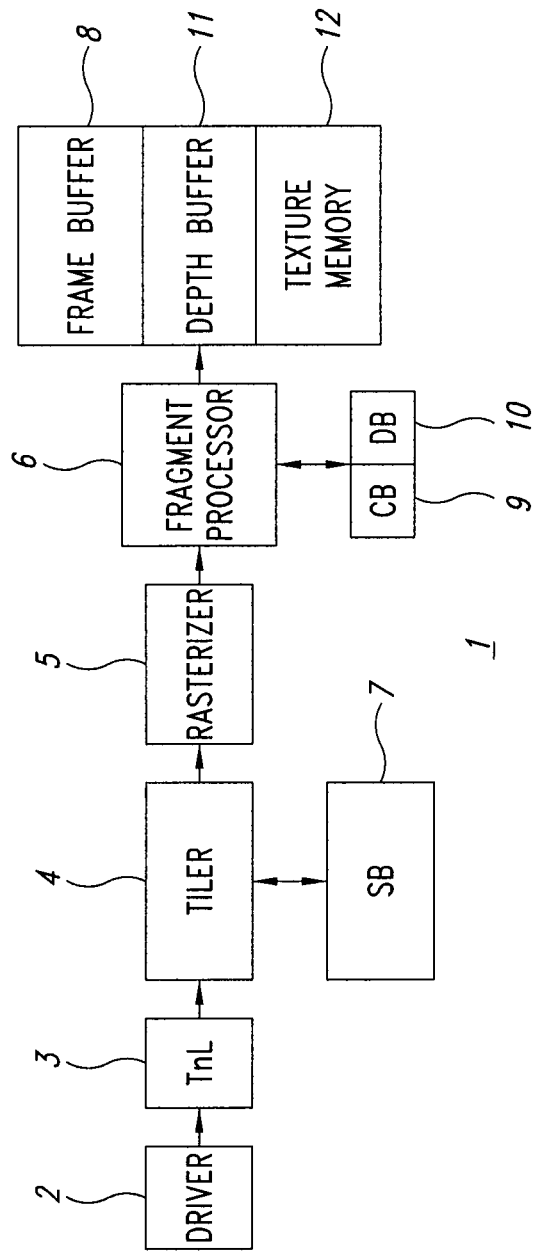
FIG. 1 shows a block scheme of a known graphic module implementing a sort-middle renderer.
Figure 2:
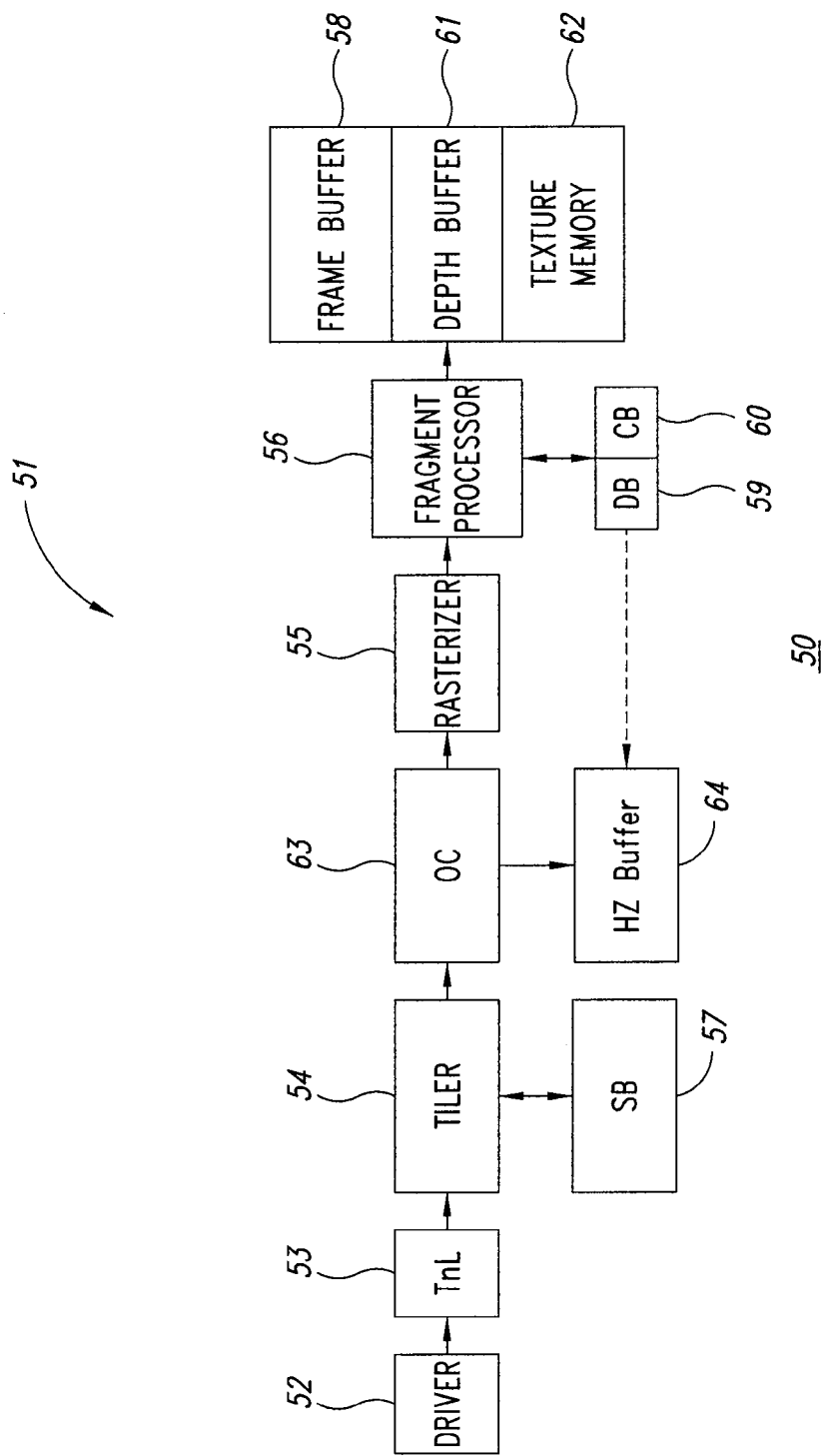
FIG. 2 shows a block scheme of a graphic module implementing the proposed graphic rendering method.

FIG. 2 is a block diagram of the graphic engine 50. Graphic engine 50 can perform the rendering of 3D (three dimensional) scenes, that are displayed on the screen 107*a* of the display 107. Particularly, the graphic engine 50 can operate according to a sort-middle rendering approach (also called "tile based" rendering).

In accordance with the sort-middle rendering, the screen 107*a* of the display 107 is divided in a plurality of 2D (two dimensional) ordered portions (i.e., 2D tiles) such as, for example, square tiles. As an example, the screen is divided into 2D tiles each having 16×16 pixels or 64×64 pixels.

The graphic engine 50, illustrated in FIG. 2, comprises a graphic pipeline 51. Such pipeline 51 comprises the following modules or stages: a driver stage 52, a geometry stage (for example of TnL type) 53, a pre-processing module 54, a rasterizer 55 and a fragment processor 56.

The driver 52 is a block having interface tasks and is configured to accept commands from programs (e.g., application protocol interface—API) running on the CPU 106 and then translate them into specialized commands for the other blocks of the graphic engine 50.

The geometry stage 53 is configured to process primitives and applying transformations to them so as to move 3D objects. As defined above, a primitive is a simple geometric entity such as, e.g., a point, a line, a triangle, a square, a polygon or high-order surface. In the following, reference will be often made to triangles, which can be univocally defined by the coordinates of their vertexes, without other types of employable primitives.

The pre-processing module comprises a tiler stage 54 (TILER) suitable to exchange data with a scene buffer 57 (SB) and, preferably, tiler 54 is arranged to operate as a binner and parser. Particularly, the tiler stage 54 acting as a binner stage is adapted to acquire from the geometry stage 53 primitive coordinates and associate them with each tile of the screen 107*a*. Particularly, the binner function of tiler 54 allows to collect lists of instructions (called "displaying lists") suitable to describe how and in which order the primitives have to be processed and to obtain the 3D scene renderized as a collection of renderized independent tiles. Such tiler stage 54 is coupled to the scene buffer 57 which is a memory able to store information provided by the tiler itself. As an example, the scene buffer 57 is a memory external to the graphic module 50 and can be the memory system 108 illustrated in FIG. 3.

It should be observed that information stored in the scene buffer 57 are attributes of submitted primitives such as position data, particularly a depth information (or z value) of each primitive with respect an observer, color data and context data indicative of operations that the rasterizer stage 55 and the fragment processor 56 have to perform on the primitive itself. In general, attributes are data (color, coordinates position, texture coordinate etc.) associated with a primitive. As an example, a triangle vertex has the following attributes: color, position, coordinates associated with texture. As known to the skilled person, a texture is an image (e.g., a bitmap image) that could be mapped on the primitive.

Acting as parser, the tiler stage 54 is responsible for reading, for each tile, the information stored in the scene buffer 57 and passing such information to the following stages also performing a primitive reordering operation.

The rasterizer stage 55 is configured to perform processing of primitive data received so as to generate pixel information representing images such as the attribute values of each pixel.

The fragment processor 56 is suitable to perform a set of operations on a fragment produced by rasterizer 55 to produce a color to be written into the display memory 107. Particularly, in one embodiment, the graphic pipeline 51 operates to process primitives in order to compose an external color buffer or frame buffer 58, a depth buffer 61 and a texture memory 62 comprised in the display memory 107 of a displayed final scene. Particularly, the frame buffer 58 stores information indicating the final color of a pixel whether such pixel is viewed onto the screen. The depth buffer 61 is suitable to indicate whether a pixel is viewed or not by memorizing the depth data (z-values) connected to the distance of a primitive from an observer. Usually, such depth data are 8-bit words allowing to map 28-1 different positions starting from a position which is nearest the observer.

In accordance with the sort-middle approach the scene is decomposed into tiles which are rendered one by one. This allows the z values and color components of one tile to be stored in small, on-chip buffers, a first depth buffer (DB) 59 and a first color buffer (CB) 60, respectively. In this way, only the pixels visible in the final scene need to be stored in the external frame buffer 58.

In operation, the user of the mobile phone 100 employs the keyboard 105 in order to select a 3D graphic application, such as a video game. As an example, such graphic application allows to show on the screen 107a several scenes. The scenes correspond to what is visible for an observer who can move assuming different positions. Accordingly, a software module corresponding to said graphic application runs on the CPU 106 and active the graphic module 50.

The applicant observes that, after the tiler 54, some primitives submitted to the rasterizer 55 could be totally occluded, then each pixel that belongs to the primitives will be occluded too. Hence totally occluded primitives could be usefully rejected without rasterizing them at all.

In a preferred embodiment, the pipeline 51 of FIG. 2 comprises a further pre-processing module 63 positioned between the tiler stage 54 and the rasterizer 55 stage. Such pre-processing module comprises a culling module (OC) 63 arranged to perform a selection or culling operation on occluded primitives exiting the geometry stage 53. Particularly, such culling module 63 is suitable to interact with a further buffer module or hierarchical z-buffer (HZ-buf) 64 to efficiently perform such culling operation (at best a primitive should pass/fail an occlusion test in one clock cycle). In one embodiment, the hierarchical z-buffer 64 module is maintained up-to-date with the content of the first depth buffer 59: each time the first depth buffer 59 is updated, the hierarchical z-buffer 64 is updated as well. In this way the two z-buffers 59 and 64 are kept aligned.

Otherwise the hierarchical z-buffer 64 module could be updated from time to time, relaxing the hypothesis of being every time consistent with the first depth buffer 59.

As known by those skilled in the art, a hierarchical z-buffer could be considered as a z-buffer pyramid having a full resolution z-buffer at the bottom of the pyramid, with lower resolution levels piling on top. For example, in a hierarchical z-buffer the full resolution z-buffer can correspond to a tile (for example, of 64×64 pixels) wherein the pixels are grouped in 2×2 or 4×4 blocks. Each lower resolution z-buffer represents a sub-tile storing the highest z values (depth values) of each block included in the tile of full-resolution level. For example, referring to FIG. 4A, a 16 pixel snapshot of a hierarchical z-buffer using 2×2 blocks is schematically displayed. Particularly, such hierarchical z-buffer comprises: a full resolution buffer 65, a middle buffer 66 and a lowest resolution buffer 67. The middle buffer 66 stores the highest z values from each of the four 2×2 blocks of the full resolution buffer 65, and the lowest resolution buffer 67 stores the highest value from the 2×2 block of the middle buffer 66. In other words, the lowest resolution z-buffer 67 represents the 16 pixels from the full resolution buffer 65.

If the hierarchical z-buffer is updated by a new value, then such value has to propagate down to each level to maintain coherence. For example, if a new primitive has to be rendered somewhere within the 16 pixels of FIG. 4A with a z value of 11, then only the lowest resolution buffer 67 needs be checked to establish that all the pixels within this 16 pixel area already have z values that would occlude the new primitive and hence such new primitive can be discarded.

Figure 4A:
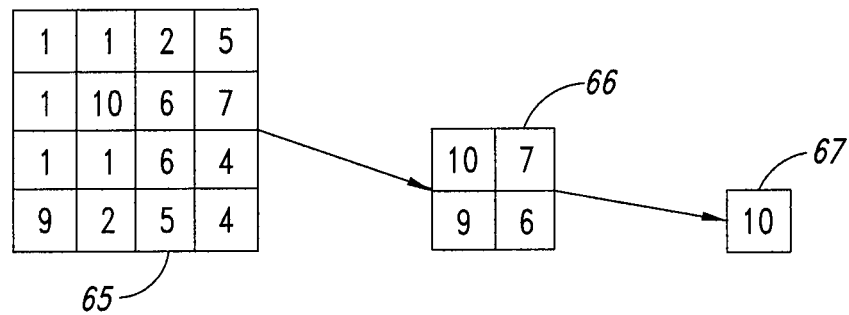
FIGS. 4A-B show schematically examples of a hierarchical z-buffer.
Figure 4B:
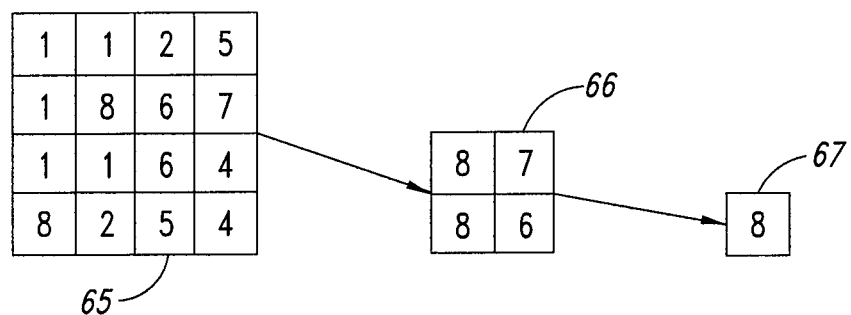

Otherwise, if another primitive having a z value of 8 needs to be rendered on these 16 pixels of FIG. 4A, the visibility or lack of visibility of such primitive is not assured from checking the lowest resolution buffer 67, but the middle buffer 66 has to be checked. On checking the middle buffer 66, it can be established that at least half of this one will definitely be occluded. Therefore, the full resolution buffer 65 still needs to be checked. On checking the full resolution buffer 65, it can be seen that only two pixels need be rewritten to and the full resolution z-buffer 65 updated with the new z values (8) for these pixels. With reference to FIG. 4B, as the full resolution z-buffer 65 has been updated, the new highest values need to propagate up to the following levels 66 and 67 of the hierarchy.

Figure 5:
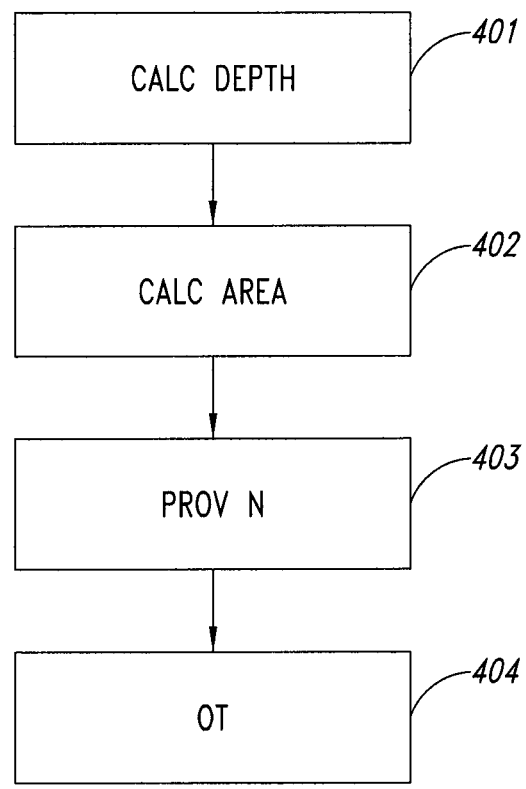
FIG. 5 shows in a flow chart graphic processing steps applied on primitives to be rendered executed by the graphic module of FIG. 2.

In a preferred embodiment, FIG. 5 shows, by means of a flow chart, a graphic method 1000 for rendering primitives on a screen. Particularly, the graphic rendering method 1000 is performed by the graphic module 50. More particularly, such graphic method 1000 is performed by the occlusion culling module (OC) 63.

In the following, it will be assumed that in the pipeline 51 the primitives (for example, triangles) are, preferably, submitted in a front-to-back order, i.e. starting from the ones having lower depth values (z values). Particularly, for a triangle, the information processed are the z values of its vertexes.

Assuming the screen 107a is divided into tiles, each tile of a current scene stored in the first depth buffer 59 can be organized as a hierarchical z-buffer in the corresponding hierarchical z-buffer 64 module. For example, for a tile of 64×64 pixels organized in 2×2 blocks, the lower resolution levels 32×32, 16×16, 8×8, . . . , 1×1 are generated by successively selecting the higher z values of each 2×2 block of the upper level. In this way, each element of the 32×32 sub-tile is mapped on 4 pixels of the 64×64 tile. In other words, for each tile, the hierarchical z-buffer 64 module maps subsequently the points of regions that are gradually more distant from the observer. In other words, each level of the hierarchical z-buffer 64 can be associated with a region and such regions can be considered belonging regions for the submitted triangles of the scene, i.e. regions where the triangles are mapped.

The graphic rendering method 1000 provides a first step (401) of calculating (CALC DEPTH) a depth value d of each primitive submitted. In general, the representative depth value d of the primitive is a floating point value ranging between 0.0 and 1.0. This value d is linearly mapped to the hierarchical z-buffer resolution, rescaling it to the range [0, $2^B$-1], where B is the resolution of the z-buffer. Usually, assuming that the primitive is a triangle, a depth value d of the triangle is chosen corresponding to the minimum depth value between the depth values of the triangle's vertexes.

Figure 6:
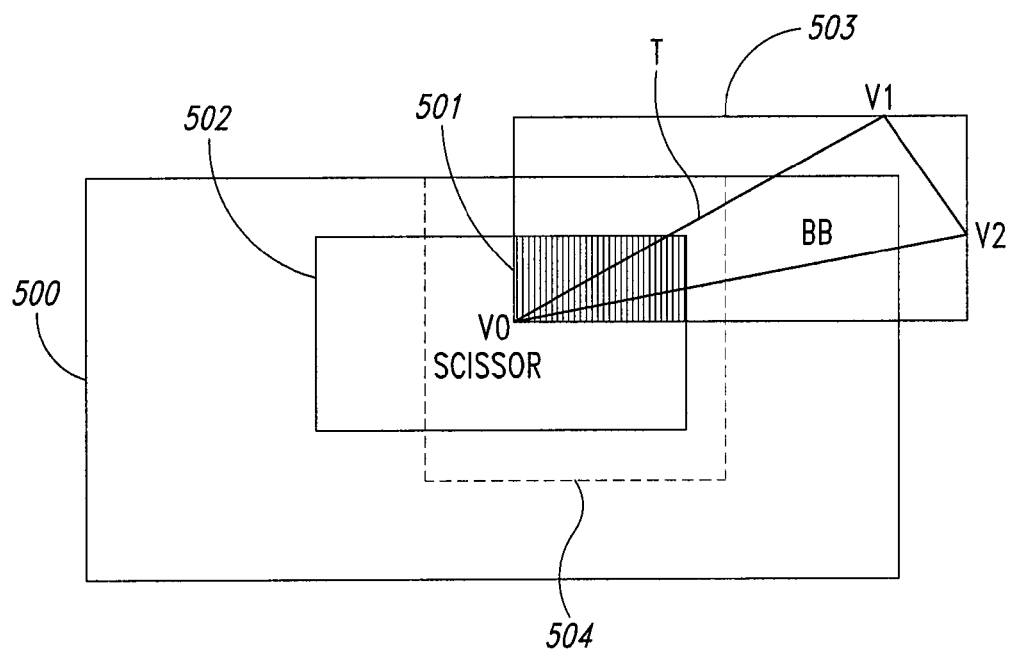
FIGS. 6 and 7 show schematically steps of calculating an intersection area and determining a multiplicity of aligned regions according to the proposed graphic rendering method.

In a further step (402), the method 1000 provides for calculating (CALC AREA) an exact area (in pixels) in which to perform an occlusion test. In more detail, referring to FIG. 6, such exact area 501 is defined as the intersection area between a current drawing area 502, also defined as a scissor area (SCISSOR), and a bounding box 503 (BB) that encloses the triangle T (having vertexes v1, v1, v2). In FIG. 6, such intersection area 501 is highlighted with shading. If the scissor area 502 is not enabled, then the active scissor area corresponds to the entire area of the 64×64 tile 500. If the intersection area 501 is empty, the triangle T is for sure outside of the current drawing area, and it could be discarded. Otherwise, the intersection area 501 calculated is considered as the exact area to be provided as an input for further steps of the proposed processing method.

A subsequent step (403) of the rendering method 1000 comprises providing (PROV N) a multiplicity of fixed aligned regions (for example, N regions) so that the intersection area 501 is suitable to be entirely covered by the union of such aligned regions, which may also extend beyond the intersection area 501.

The method 1000 further comprises a step (404) of performing the occlusion test (OT). Particularly, such occlusion test comprises a multiplicity of occlusion queries performed by comparing the depth value d of the triangle T with reference data, i.e. corresponding depth values v1, v2, . . . , vN read from the levels of the hierarchical z-buffer associated with such multiplicity of N aligned regions.

As indicated above, depth values v1, v2, . . . , vN are assumed to be the maximum depth values of each aligned region used to map the triangle T, i.e. the N regions that entirely cover the intersection area 501. Therefore, by executing N occlusion queries, if the minimum depth value d of the triangle T (the closest vertex) is bigger than all maximum values vi (with i=1, 2, . . . , N) such triangle T is totally occluded, hence it can be discarded at early stage of the pipeline 51 before the rasterizer 55. Otherwise, if some values vi are bigger while others are smaller with respect the minimum depth value d of the triangle, such primitive is partially visible. Then, it is forwarded to the rasterizer stage 55 and the visibility determination will be solved by the fragment processor stage 56, i.e. at pixel level.

With reference to FIG. 6, assuming to use only one region 504 that entirely covers the intersection area 501, for example, the region corresponding to the 32×32 level of the hierarchical z-buffer, the maximum depth value v32 of such region 504 can fall into a portion of the region 504 that is outside the intersection area itself 501. Therefore, in this case, performing an occlusion test would be meaningless.

Figure 7:
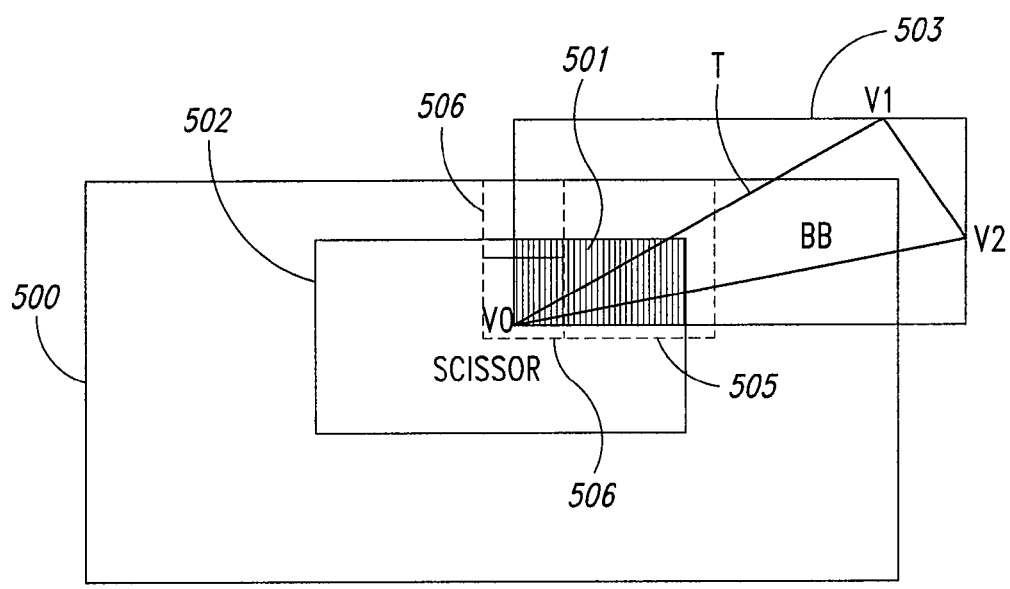

Otherwise, according to the proposed graphic rendering method 1000, three aligned regions can be selected that entirely cover the intersection area 501 as indicated in FIG. 7. For example, a first region 505 corresponding to the 16×16 level of the hierarchical z-buffer 64 and two adjacent second regions 506 corresponding to the 8×8 level. Particularly, such first 505 and second 506 regions are of lower hierarchical level with respect the region 504. In this case, three different occlusion queries are performed.

When a triangle pass the test, the first depth buffer 59 is updated and the content of the hierarchical z-buffer 64 is updated consequently.

Advantageously, the occlusion queries (OT) for all the N aligned regions selected can be performed in parallel.

Advantageously, the proposed method ensures that totally visible or partially visible primitives always pass the test and a totally occluded primitive is most of the times rejected.

Advantageously, the proposed method is able to increase the number of occluded primitives culled before rasterization, compared to current known methods. It means lowering the workload of the rasterizer 55, in particular the triangle setup phase of the rasterizer itself.

The applicant noticed that such method is able to effectively decrease the workload of the rasterizer 55 and fragment processor 56 up to 50%.

In addition, the cost in terms of bandwidth due to the introduction into the pipeline 51 of the occlusion culling module 63 is balanced by a relevant reduction of the external bandwidth for the frame buffer 58 and depth buffer 62.

It should be observed that the graphic module 50 of FIG. 2 fully and correctly implements all the specifications of OpenGL/ES 1.1. Particularly, the method hereby described has been proved to pass all the 1.1 OpenGL/ES conformance tests.

Moreover, in order to test the performances of module 50 several OpenGL games and applications (for example, Quake II, Quake III, TuxRacer, etc.) have been used as typical inputs. Meaningful results were obtained from the game Quake III.

Figures 8, 9, 10:
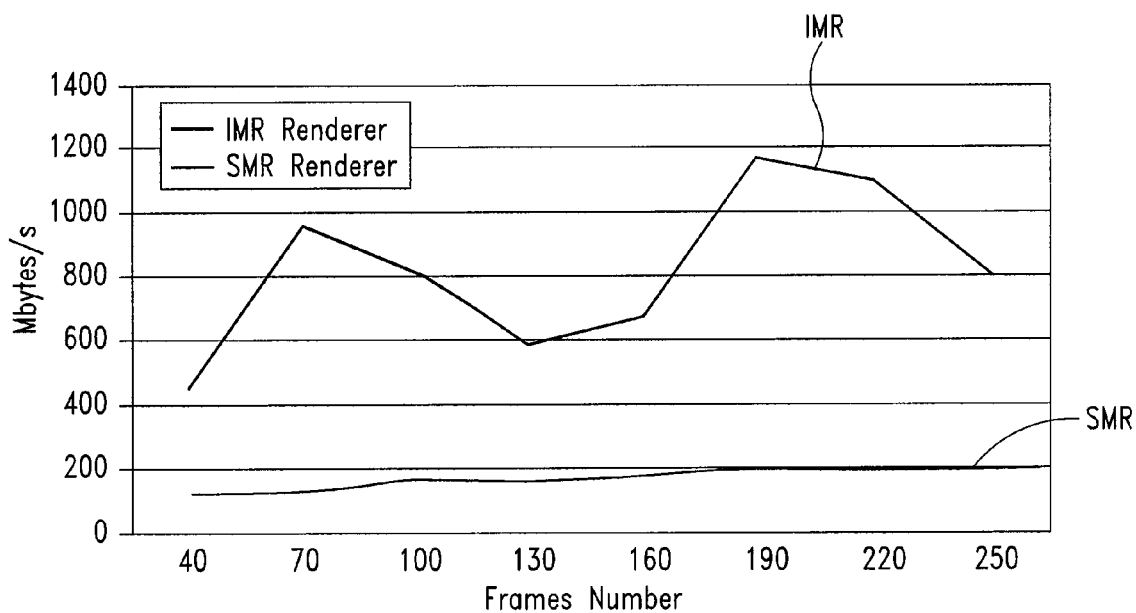
FIG. 8 shows a table indicating performances related to an occlusion culling module comprised in the graphic module of FIG. 2.
FIG. 9 shows a diagram suitable to point out the external bandwidth reduction obtainable with the graphic module of FIG. 2 compared with the graphic modules known in the art.
FIG. 10 shows a table indicating performances referred to a reduction of the external bandwidth that are obtained with the module of FIG. 2 with reference to a game Quake III.

FIGS. 8, 9 and 10 point out performances obtained by overdraw reduction mechanisms, assuming a screen resolution VGA 640×480 with anti-aliasing RGSS 4× and with a objective frame rate of 30 fps (frame per second).

In this scenario, the results obtained in terms of external bandwidth are also relevant: the sort-middle architecture (SMR) has a total external bandwidth of 157 Mbytes/s, while a traditional renderer (immediate mode renderer IMR) needs 815 Mbytes/s, as evident in the scheme of FIG. 9.

Table in FIG. 8 provides a measure of impact of the proposed occlusion culling method (OC) assuming different dimensions of screen blocks. The occlusion culling function operates on the basis of primitive screen coordinates. By introducing occlusion culling, would eliminate for those occluded geometries the need of both fragment generation and triangle formation.

The table of FIG. 10 presents the external bandwidth, pointing out the contribution of each stage of pipeline 51. Two scenarios are analyzed (with 30 fps): VGA resolution with anti-aliasing 4× RGSS and QVGA resolution (320×340) without anti-aliasing. IMR refers to immediate mode renderer and SMR refers to sort-middle renderer of FIG. 2. Symbol "*" used in FIG. 10 indicates that the immediate mode renderer does not comprise the binner and parser functions.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for rendering a three dimensional scene on a displaying screen divided into tiles, the method comprising:

processing primitive data representing submitted primitives of the scene according to a sort-middle technique, the processing including:

providing, for a tile of a current scene, a hierarchical z-buffer which comprises a plurality of levels organized according to depth values of the tile;

for each of the submitted primitives:

calculating a minimum depth value of the submitted primitive;

calculating an intersection area associated with said submitted primitive with respect to said tile;

providing a plurality of aligned regions each associated with one of the levels of the hierarchical z-buffer so that the intersection area calculated is suitable to be entirely covered by a union of such aligned regions;

comparing the minimum depth value of the submitted primitive with corresponding maximum depth values of the aligned region, each maximum depth value being read from the levels of the hierarchical z-buffer; and discarding said submitted primitive if the minimum depth value is bigger than all of the maximum depth values.

2. The method according to claim 1, wherein the primitives are submitted in a front-to-back order starting from primitives having lower depth values.

3. The method according to claim 1, wherein the minimum depth value of the primitive is a floating point value ranging between 0.0 and 1.0.

4. The method according to claim 1 further comprising linearly mapping the minimum depth value to a resolution of the hierarchical z-buffer, rescaling the minimum depth value to a range $[0, 2^B-1]$, where B is the resolution of the hierarchical z-buffer.

5. The method according to claim 1, wherein the primitives submitted are triangles.

6. The method according to claim 5, wherein, for each of the triangles, the minimum depth value of the triangle is chosen corresponding to a minimum depth value between depth values of vertexes of the triangle.

7. The method according to claim 5, wherein, for each of the triangles, said intersection area is an area of intersection between a current drawing area and a bounding box that encloses the triangle.

8. The method according to claim 1, wherein said step of comparing the minimum depth value with each of the maximum depth values of the hierarchical z-buffer is performed for all of the aligned regions in parallel.

9. The method according to claim 1, further comprising for each submitted primitive:

allowing said primitive to be further processed if the minimum depth value of the primitive is lower than at least one of the maximum depth values; and updating the maximum depth values of the hierarchical z-buffer corresponding to the tile only if the minimum depth value of the primitive is lower than at least one of the maximum depth values.

10. A graphic system comprising:
a central processing unit;
a system memory coupled to the central processing unit;
a display unit provided with a corresponding screen divided into tiles;
a graphic module coupled to and controlled by the central processing unit to render an image on the screen by processing primitive data representing submitted primitives of a scene according to a sort-middle technique, said graphic module comprising:
a hierarchical z-buffer module structured to store reference data; and
a pre-processing module associated with the z-buffer module and structured to avoid displaying occluded primitives by performing a depth test to by comparing primitive data of each primitive submitted with the reference data stored in the hierarchical z-buffer module, said reference data being related to a tile, wherein the z-buffer module comprises a plurality of levels organized according to depth values of the tile and the pre-processing module is configured to, for each of the submitted primitives:

calculate a minimum depth value of the submitted primitive;

calculate an intersection area associated with said submitted primitive with respect to said tile;

provide a plurality of aligned regions each associated with one of the levels of the hierarchical z-buffer module according to the intersection area calculated;

compare the minimum depth value of the submitted primitive with corresponding maximum depth values of the aligned region, each maximum depth value being read from the levels of the hierarchical z-buffer; and discard said submitted primitive if the minimum depth value is bigger than all of the maximum depth values.

11. The system according to claim 10 wherein the graphic module includes a rasterizer configured to perform processing of primitive data received so as to generate pixel information representing images such as the attribute values of each pixel, the pre-processing module being structured to:

transmit to the rasterizer submitted primitives having a minimum depth value that is not bigger than all of the maximum depth values; and block from the rasterizer submitted primitives having a minimum depth value that is bigger than all of the maximum depth values.

12. The system according to claim 11, wherein the graphic module includes a fragment processor arranged to perform a set of operations on a fragment produced by the rasterizer to produce a color to be written into the display memory.

13. The system according to claim 12, wherein the graphic module includes a first depth buffer and a first color buffer associated with the fragment processor in order to store depth values and color components of a tile of the screen.

14. The system according to claim 13, wherein the graphic module includes means for updating content of the hierarchical z-buffer module with content of said first depth buffer.

15. The system according to claim 10, further comprising:
an antenna;
a transceiver connected with the antenna and coupled to the central processing unit;
an audio circuit unit connected with the transceiver and coupled to the central processing unit;
a speaker and a microphone connected with the audio circuit unit; and
a user interface connected to the central processing unit.

16. The system of claim 10 wherein said system is one of the following systems: a mobile telephone, a play station, a PDA, a game console, a car navigation system, and a set top box.

17. A graphic module for rendering a three dimensional scene on a displaying screen divided into tiles, comprising:
a hierarchical z-buffer module structured to store depth values of a tile of the scene according to a plurality of resolution levels; and
a pre-processing module associated with the z-buffer module and configured to:
calculate a minimum depth value of a submitted primitive;
calculate an intersection area associated with said submitted primitive with respect to said tile;
provide a plurality of aligned regions each associated with one of the levels of the hierarchical z-buffer module so that the intersection area calculated is suitable to be entirely covered by a union of such aligned regions;
compare the minimum depth value of the submitted primitive with corresponding maximum depth values of the aligned region, each maximum depth value being read from the levels of the hierarchical z-buffer; and discard said submitted primitive if the minimum depth value is bigger than all of the maximum depth values.

18. The graphic module according to claim 17, further comprising a rasterizer configured to perform processing of primitive data received so as to generate pixel information representing images such as the attribute values of each pixel, the pre-processing module being structured to:

transmit to the rasterizer submitted primitives having a minimum depth value that is not bigger than all of the maximum depth values; and block from the rasterizer submitted primitives having a minimum depth value that is bigger than all of the maximum depth values.

19. The graphic module according to claim 18, further comprising a fragment processor arranged to perform a set of operations on a fragment produced by the rasterizer to produce a color to be written into the display memory.

20. The graphic module according to claim 19, further comprising a first depth buffer and a first color buffer associated with the fragment processor in order to store depth values and color components of a tile of the screen.

21. The graphic module according to claim 20, further comprising means for updating content of the hierarchical z-buffer module with content of said first depth buffer.

* * * * *